(12) United States Patent
Malybaeva et al.

(10) Patent No.: US 6,214,302 B1
(45) Date of Patent: Apr. 10, 2001

(54) PRODUCTION OF ALUMINUM SULFATE FROM COAL ASH

(76) Inventors: Gainel Malybaeva; Dariavash Partovi, both of P.O. Box 2604, Spring, TX (US) 77383-2604

( * ) Notice: Subject to any disclaimer, the term of this patent is extended or adjusted under 35 U.S.C. 154(b) by 0 days.

(21) Appl. No.: 08/748,805

(22) Filed: Nov. 14, 1996

Related U.S. Application Data

(63) Continuation-in-part of application No. 08/308,990, filed on Nov. 18, 1994, now abandoned.

(51) Int. Cl.[7] .............................. C01F 7/74; C22B 21/00
(52) U.S. Cl. ........................ 423/128; 423/140; 423/556
(58) Field of Search .................................. 423/556, 140, 423/DIG. 2, 305, 132, 128

(56) References Cited

U.S. PATENT DOCUMENTS

| | | | |
|---|---|---|---|
| 1,444,160 | * | 2/1923 | Mejdell .............................. 423/140 |
| 2,063,029 | * | 12/1936 | Coleman et al. ..................... 423/140 |
| 2,416,508 | * | 2/1947 | Barnes et al. ........................ 423/556 |
| 2,754,174 | * | 7/1956 | Roberts .......................... 423/DIG. 2 |
| 2,861,869 | * | 11/1958 | Reeve .................................... 423/305 |
| 4,567,026 | * | 1/1986 | Lisowyj ................................ 423/132 |
| 5,296,151 | * | 3/1994 | Muller et al. ........................ 423/140 |

FOREIGN PATENT DOCUMENTS

| | | | |
|---|---|---|---|
| 290554 | * | 6/1991 | (DD) ................................... 423/140 |
| 52-12699 | * | 1/1977 | (JP) ....................................... 423/140 |
| 647249 | * | 2/1979 | (SU) ............................... 423/DIG. 2 |

* cited by examiner

*Primary Examiner*—Steven Bos

(57) ABSTRACT

The object of this invention is to provide a new low-cost method of production of the Aluminum Sulfate (Alum, Type 1, Class 1 and 2) from any alumina contained raw material, which comprises of selective precipitation of ferric ions from aluminum sulfate solution by adding a soluble phosphate compound at pH at least of 2.0.

5 Claims, No Drawings

PRODUCTION OF ALUMINUM SULFATE FROM COAL ASH

This application is a continuation-in-part of application Ser. No. 08/308,990, filed Nov. 18, 1994, now abandoned.

FIELD OF THE INVENTION

This invention relates to improvements in the production of aluminum sulfate from the alumina content raw materials.

BACKGROUND OF THE INVENTION

Crystals of alumina sulfate can be obtained by treating minerals containing alumina with sulfuric acid, extracting aluminum salts from the minerals-and crystallizing aluminum sulfate from the extracted solution. Crystalline sulfate can also be obtained together with iron sulfate from waste sulfuric acid or the like which contains considerable amount of iron and aluminum. However, aluminum sulfate crystals cannot be separated easily from crystals of the other metals in these processes.

Herefore, technically pure aluminum sulfate crystals have been generally obtained by crystallizing the impure aluminum salts from previously purified aluminum sulfate solutions. However, these purification procedures have been troublesome and it has been difficult to obtain pure aluminum sulfate crystals inexpensively by such prior art methods. A need, therefore, continues to exist for a simple, low-cost method of obtaining pure, crystalline aluminum sulfate.

SUMMARY OF THE INVENTION

The object of this invention is to provide a new, low-cost method of producing aluminum sulfate purified of iron, which complies with the chemical specifications of the American Water Works Association B403-88 and Federal specification O-A-429D, Type 1, Class 1 and 2, and which may be certified by the National Sanitation Foundation (NSF) for use in the treatment of drinking water at the maximum dosage of 150 mg/l. The required aluminum content is 17% (as aluminum oxide) and maximum of 0.75% of water soluble iron (as iron oxide). The weight ratio of $Al_2O_3$ to maximum allowable $Fe_2O_3$ content is 22.67.

The objective can be achieved by a process of selective settlement of iron phosphate from the extracted solution of aluminum sulfate with impurities separately from aluminum salts. As a result of this process a pure aluminum sulfate solution with a weight ratio of $Al_2O_3$ to $Fe_2O_3$ not less than 22.67 can be obtained.

DETAILED DESCRIPTION OF PREFERRED EMBODIMENT

In the process of the present invention an extracted solution of aluminum sulfate with impurities of iron sulfate is treated with a solution of sodium phosphate (or any other water soluble phosphate salt, or phosphoric acid). The amount of the sodium phosphate should be enough for the completion of the iron precipitation (in our examples 30–100%), and the pH level of the extracted solution is between 2.0–4.0.

It is known that the phosphate salts of aluminum, iron, and other impurities which may be present in the extracted solution are not soluble in water. The solubility constant of the salts are presented in the Table entitled "Solubility Product Constants" of the Handbook of Chemistry and Physics, 67th Edition, p. B-207. According to these data the addition of the sodium phosphate (or any water soluble phosphate salt, or phosphoric acid) should precipitate the above mentioned metals as phosphate salts. In our process of aluminum sulfate production, due to certain pH or extracted solution, we achieved the selective precipitation of iron phosphate. The aluminum sulfate stays in the solution. This unexpected effect of pH and probably other unknown factors will allow us to obtain the technically pure aluminum sulfate.

EXAMPLE 1

Coal ash containing 28.6% $Al_2O_3$, 61.1% $SiO_2$, 3.7% $Fe_2O_3$, 0.8% CaO, 0.9% MgO, etc. was treated. 1000 g (gram) of the ash was extracted by 2900 ml 30% sulfuric acid, during 2 hours, at 105° C. As a result of extraction and filtration there was obtained 3020 ml of extracted solution with 85.8 g/l of alumina (as $Al_2O_3$) and 11.1 g/l of iron (as $Fe_2O_3$). The pH level of the extracted solution is 2.0. Iron phosphate precipitation was done by addition of 68.67 g of sodium phosphate in a 50% solution. This amount, 68.67 g, is required for 100% precipitation of iron, contained in extracted solution. The iron phosphate started to precipitate immediately after addition of sodium phosphate. After 2 hours of sedimentation the residue and solution was filtered, and 3000 ml of pure solution with 84.94 g/l of alumina, and 0.85 g/l of iron was evaporated. The aluminum sulfate was crystallized from the pure solution, and it has 17% of alumina and 0.17% of iron (as $Fe_2O_3$) which is less than the required maximum of $Fe_2O_3$ content in the technical grade aluminum sulfate.

EXAMPLE 2

Coal ash containing 28.6% $Al_2O_3$, 61.1% $SiO_2$, 3.7% $Fe_2O_3$, 0.8% CaO, 0.9% MgO, etc. was treated. 1000 g (gram) of the ash was extracted by 2900 ml 30% sulfuric acid, during 2 hours, at 105° C. As a result of extraction and filtration there was obtained 3100 ml of extracted solution with 84.9 g/ of alumina (as $Al_2O_3$) and 12.3 g/l of iron (as $Fe_2O_3$). The pH of the extracted solution is 1.8. For 100% iron phosphate precipitation, 68.97 g of sodium phosphate in a 50% solution was added. The iron phosphate did not precipitate. After 2 hours, 3200 ml of solution with 84.60 g/l of alumina and 12.24 g/l of iron was evaporated. The aluminum sulfate was crystallized from the solution and it has 17% of alumina and 2.45% of iron (as $Fe_2O_3$) which is higher than the required maximum of $Fe_2O_3$ content in the technical grade aluminum sulfate.

EXAMPLE 3

Coal ash containing 28.6% $Al_2O_3$, 61.1% $SiO_2$, 3.7% $Fe_2O_3$, 0.8% CaO, 0.9% MgO, etc. was treated. 1000 g (gram) of the ash was extracted by 2700 ml 30% sulfuric acid, during 2 hours, at 105° C. As a result of extraction and filtration, there was obtained 2900 ml of extracted solution with 87.2 f/l of alumina (as $Al_2O_3$) and 11.8 g/l of iron (as $Fe_2O_3$) pH of the extracted solution was 2.2; to achieve pH 2.8, we added a few ml of NaOH solution. Iron phosphate precipitation was done by addition of the 68.78 g of sodium phosphate in a 50% solution. This amount 68.78 g is required for 100% precipitation of iron, contained in extracted solution The iron phosphate started to precipitate immediately after adding of sodium phosphate. After 2 hours of sedimentation, the residue and solution was filtered, and 2950 ml of pure solution with 86.5 g/l of alumina, and 0.87 g/l of iron was evaporated. The aluminum sulfate was crystallized from the pure evaporated solution, and it has 17% of alumina and 0.17% of iron (as $Fe_2O_3$) which is less than required maximum of $Fe_2O_3$ content in the technical grade aluminum sulfate.

EXAMPLE 4

Coal ash containing 28.7% $Al_2O_3$, 61.1% $SiO_2$, 3.7% $Fe_2O_3$, 0.8% CaO, 0.9% MgO, etc. was treated. 1000 g (gram) of the ash was extracted by 2700 ml 30% sulfuric acid, during 2 hours, at 105° C. As a result of extraction and filtration, it was obtained 2900 ml of extracted solution with 86.10 g/l of alumina (as $Al_2O_3$) and 11.7 g/l of iron (as $Fe_2O_3$). The pH of the extracted solution is 2.2. To achieve pH 4.5, we added a few ml of NaOH solution. Iron phosphate precipitation was done by addition of the 68.78 g of sodium phosphate in a 50% solution. This amount of 68.78 g is required for 100% precipitation of iron, contained in extracted solution. The iron phosphate started to precipitate immediately after adding of sodium phosphate. After 2 hours of sedimentation, the residue and solution was filtered, and 2940 ml of pure solution with 32.90 g/l of alumina, and 0.33 g/l of iron was evaporated. The aluminum sulfate was crystallized from the pure evaporated solution.

Aluminum sulfate has 17% of alumina and 0.17% of iron (as $Fe_2O_3$), which is less tan required maximum of $Fe_2O_3$ content in the technical grade aluminum sulfate. It should be noted that in these conditions, more than 60% of alumina from solution is lost due to hydrolysis which occurs with iron phosphate precipitation.

EXAMPLE 5

Coal ash containing 28.6% $Al_2O_3$, 61.1% $SiO_2$, 0.8% CaO, 0.9% MgO, etc. was treated. 1000 g (gram) of the ash was extracted by 2700 ml 30% sulfuric acid, during 2 hours, at 105° C. As a result of extraction and filtration, there was obtained 2900 ml of extracted solution with 85.10 g/l of alumina (as $Al_2O_3$) and 11.60 g/l of iron (as $Fe_2O_3$). pH of the extracted solution is 2.2. Iron phosphate precipitation was done by addition of the 48.19 g of sodium phosphate in a 50% solution. This amount of 48.19 is required for 70% precipitation of iron, contained in extracted solution. The iron phosphate started to precipitate immediately after addition of sodium phosphate. After 2 hours of sedimentation, the residue and solution was filtered, and 2940 ml of pure solution with 84.90 g/l of alumina, and 1.29 g/l of iron was evaporated. The aluminum sulfate was crystallized from the pure evaporated solution. Aluminum sulfate has 17% of alumina and 0.26% if iron (as $Fe_2O_3$), which is less than required maximum of $Fe_2O_3$ content in the technical grade aluminum sulfate.

EXAMPLE 6

Coal ash containing 28.6% $Al_2O_3$, 61.1% $SiO_2$, 3.7% $Fe_2O_3$, 0.8% CaO, 0.9% MgO, etc. was treated 1000 g (gram) of the ash was extracted by 2700 ml 30% sulfuric acid, during 2 hours, at 105° C. As a result of extraction and filtration, there was obtained 2900 ml of extracted solution with 84.90 g/l of alumina (as $Al_2O_3$) and 12.10 g/l of iron (as $Fe_2O_3$). pH of the extracted solution is 2.2. Iron phosphate precipitation was done by addition of the 17.15 g of sodium phosphate in a 50% solution. This amount of 17.15 g is required for 25% precipitation of iron, contained in extracted solution. The iron phosphate started to precipitate immediately after addition of sodium phosphate. After 2 hours of sedimentation, the residue and solution was filtered, and 2940 ml of pure solution with 84.40 g/l of alumina and 4.10 g/l of iron was evaporated. The aluminum sulfate was crystallized from the pure evaporated solution. Aluminum sulfate has 17% of alumina and 0.82% of iron (as $Fe_2O_3$), which is higher than the required maximum of $Fe_2O_3$ content in the technical grade aluminum sulfate.

TABLE 1

| pH level | Amount of Sodium Phosphate in % to $Fe_2O_3$ content, % by weight | Extracted Solution Content | | Pure Solution Content | | Weight ratio $Al_2O_3$ to $Fe_2O_3$ |
|---|---|---|---|---|---|---|
| | | $Al_2O_3$, g/l | $Fe_2O_3$, g/l | $Al_2O_3$, g/l | $Fe_2O_3$, g/l | |
| 1.8 | 100 | 84.9 | 12.3 | 84.9 | 12.3 | 6.90 |
| 2.0 | 100 | 85.8 | 11.1 | 84.9 | 0.85 | 99.88 |
| 2.8 | 100 | 87.2 | 11.8 | 86.5 | 0.87 | 99.43 |
| 3.5 | 100 | 86.3 | 12.0 | 85.2 | 0.87 | 97.93 |
| 4.0 | 100 | 85.2 | 11.4 | 84.3 | 0.81 | 104.07 |
| 4.5 | 100 | 86.1 | 11.7 | 32.9 | 0.33 | 99.69 |
| 2.4 | 100 | 84.3 | 11.4 | 83.6 | 0.88 | 95.00 |
| 2.4 | 95 | 84.7 | 11.7 | 83.8 | 0.94 | 89.15 |
| 2.4 | 70 | 85.1 | 11.6 | 84.9 | 1.29 | 65.81 |
| 2.4 | 65 | 85.6 | 11.4 | 84.9 | 1.40 | 60.64 |
| 2.4 | 50 | 85.2 | 11.2 | 85.0 | 1.79 | 47.49 |
| 2.4 | 40 | 86.1 | 12.0 | 85.3 | 2.50 | 34.12 |
| 2.4 | 30 | 85.0 | 12.1 | 84.2 | 3.33 | 25.28 |
| 2.4 | 25 | 84.9 | 12.1 | 84.4 | 4.10 | 20.59 |

It is obvious from the data presented in Table 1 that the amount of $Fe_2O_3$ in the pure solution will not change if the pH level of the extracted solution is not less than 2 and not more than 4.0. In this range the weight ratio of $Al_2O_3$ to $Fe_2O_3$ in the pure solution is high enough to produce pure aluminum sulfate. When the pH level of the extracted solution is 1.8, precipitation does not occur. When the pH level is higher than 4.0, the precipitation occurs with hydrolysis such that the iron and aluminum precipitates as hydroxides.

The second part of the Table 1 shows the results of changing the amount of sodium phosphate. The best results were obtained when the amount of sodium phosphate to $Fe_2O_3$ content was in the range of 30–100% by weight. When the amount was less than 30%, the weight ratio of $Al_2O_3$ to $Fe_2O_3$ in a purified solution is not enough for obtaining technically pure aluminum sulfate. It should be noted that the sodium phosphate amount is dependent on the iron oxide content in the raw material. So, the optimum amount is the minimum amount of the sodium phosphate, which allows one to obtain technically pure aluminum sulphate.

The amount of aluminum loss during the precipitation process does not exceed 1–3% at optimum conditions (pH levels in the range of 2–4, and amount of sodium phosphate to $Fe_2O_3$ 30–100% by weight).

What is claimed is:

1. A process for producing high purity aluminum sulfate from coal ash wherein the weight ratio of $Al_2O_3$ to $Fe_2O_3$ in the purified aluminum sulfate is greater than 22.67, wherein said process comprises:
   (a) treating coal ash with sulfuric acid until the pH level is between 1.8 and 4.0;
   (b) adding a water soluble phosphate salt or phosphoric acid to the product of step (a) to form a solution for a time sufficient for iron phosphate to precipitate from said solution;
   (c) filtering the solution of step b; and
   (d) crystallizing purified aluminum sulfate from the filtered solution.

2. A process for producing high purity aluminum sulfate from an aluminum extract containing aluminum sulfate and iron, wherein said process comprises:
   (a) adding a water soluble phosphate salt or phosphoric acid to the aluminum extract to form a solution while maintaining the extract at a pH level between 1.8 and 4.0 for a time sufficient for iron phosphate to precipitate from said solution;
   (b) filtering the solution of step (a);
   (c) crystallizing purified aluminum sulfate from the filtered solution; and
   (d) obtaining a high purity aluminum sulfate having a weight ratio of $Al_2O_3$ to $Fe_2O_3$ greater than 22.67.

3. The process of claim 2, wherein the aluminum extract is collected by treating coal ash comprising aluminum sulfate.

4. A process for reducing the concentration of iron in an aluminum sulfate extract which comprises forming a treated aluminum sulfate extract by adding phosphoric acid or a phosphate salt to the aluminum sulfate extract in an amount and for a time sufficient to precipitate iron phosphate therefrom wherein the weight ratio of $Al_2O_3$ to $Fe_2O_3$ in the treated aluminum sulfate extract is greater than or equal to 22.67 and further wherein the pH level of the aluminum sulfite extract is between 2.0 and 4.0.

5. The process of claim 4, wherein the aluminum sulfate extract is collected by treating coal ash comprising aluminum sulfate by adding a water soluble phosphate salt or phosphoric acid to the aluminum sulfate extract to form a solution while maintaining the solution at a pH level between 1.8 and 4.0 for a time sufficient for iron phosphate to precipitate from said solution.

* * * * *

UNITED STATES PATENT AND TRADEMARK OFFICE
CERTIFICATE OF CORRECTION

PATENT NO. : 6,214,302 B1
DATED : April 10, 2001
INVENTOR(S) : Gainel Malybaeva

It is certified that error appears in the above-identified patent and that said Letters Patent is hereby corrected as shown below:

<u>Title page,</u>
Item [76], Inventors should read -- Gainel Malybaeva
2821 Cedar Glade Dr., Naperville, Il 60564 --

Signed and Sealed this

Sixteenth Day of July, 2002

*Attest:*

*Attesting Officer*

JAMES E. ROGAN
*Director of the United States Patent and Trademark Office*